US012562509B2

(12) United States Patent
Sivertsen et al.

(10) Patent No.: US 12,562,509 B2
(45) Date of Patent: Feb. 24, 2026

(54) ELECTRONIC CONNECTOR WITH INTEGRATED DUAL SENSE TERMINAL DEVICE

(71) Applicant: CableMod Limited, Sheung Wan (HK)

(72) Inventors: Clas Sivertsen, Lilburn, GA (US); Lester Lau, New Taipel (TW); Thomas Kuhlenbach, Taipei (TW)

(73) Assignee: CableMod Limited, Hong Kong (HK)

( * ) Notice: Subject to any disclaimer, the term of this patent is extended or adjusted under 35 U.S.C. 154(b) by 261 days.

(21) Appl. No.: 18/322,596

(22) Filed: May 24, 2023

(65) Prior Publication Data

US 2024/0396236 A1 Nov. 28, 2024

(51) Int. Cl.
*H01R 13/502* (2006.01)
*H01R 4/48* (2006.01)

(52) U.S. Cl.
CPC ............. *H01R 4/48* (2013.01); *H01R 13/502* (2013.01)

(58) Field of Classification Search
None
See application file for complete search history.

(56) References Cited

FOREIGN PATENT DOCUMENTS

DE 19702373 B4 * 2/2008 ......... H01R 13/7032

* cited by examiner

*Primary Examiner* — Tho D Ta
(74) *Attorney, Agent, or Firm* — LIN IP, LLC; Jeoyuh Lin

(57) ABSTRACT

An electronic connector, including a housing having: a first row of power terminals, a second row of power terminals, and a row of sense terminals; and a stamped metal insert inserted into the housing, having: a first mating feature, and a second mating feature, wherein the housing further includes a groove that receives the stamped metal insert and establishes a pressurized connection between at least one of the sense terminals in the row of sense terminals and at least one of the power terminals in the first row of power terminals.

10 Claims, 6 Drawing Sheets

FIG. 1A
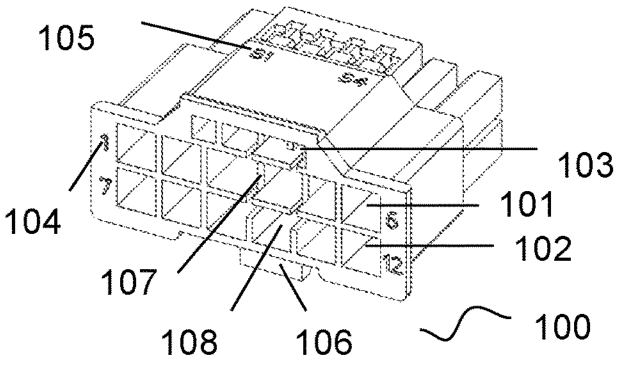
FIG. 1B
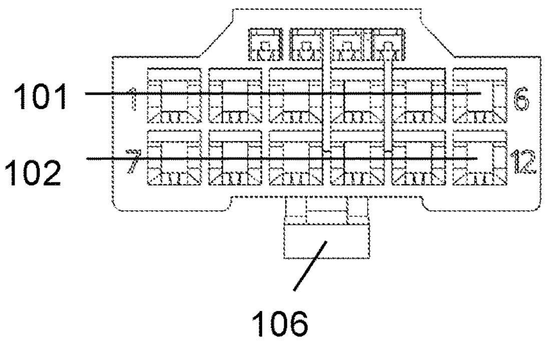
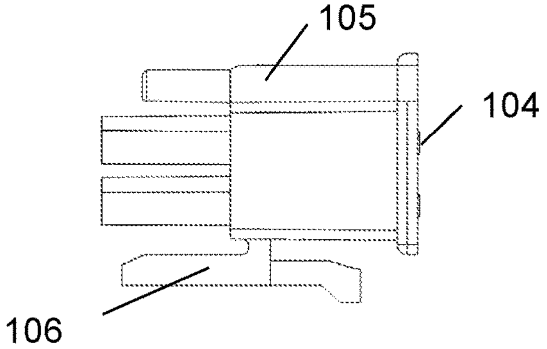
FIG. 1C
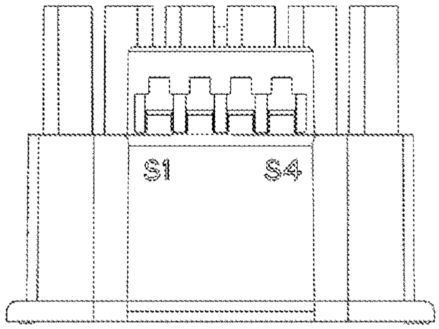
FIG. 1D

FIG. 1E
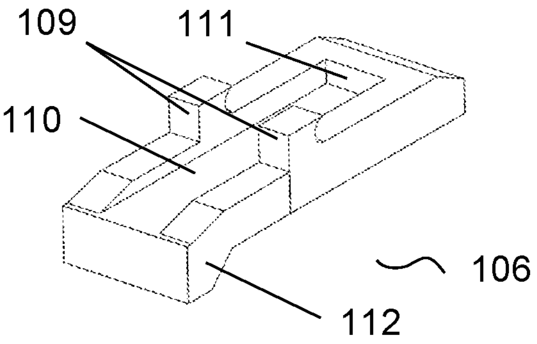
FIG. 1F
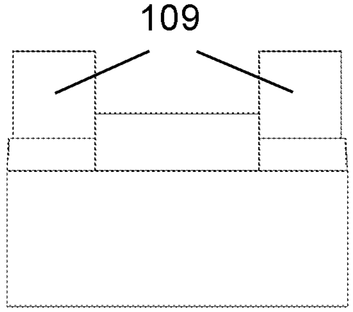
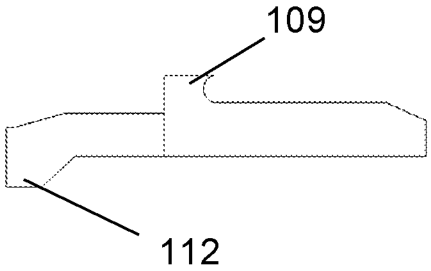
FIG. 1G
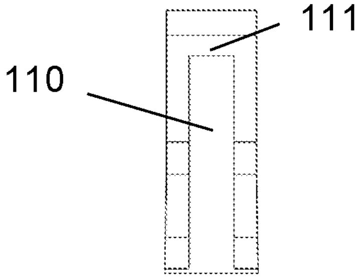
FIG. 1H

FIG. 2A
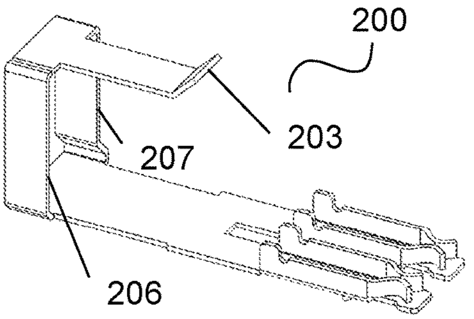
FIG. 2B
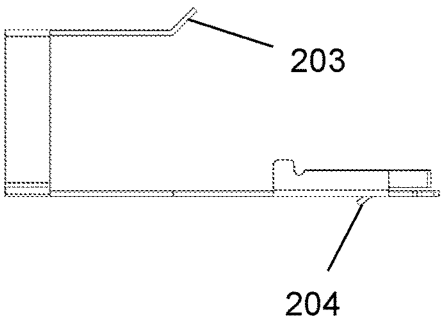
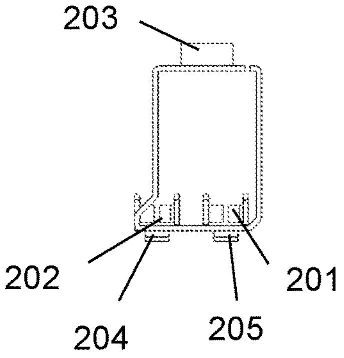
FIG. 2C
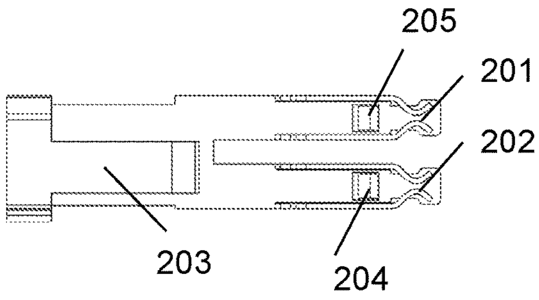
FIG. 2D

FIG. 3A
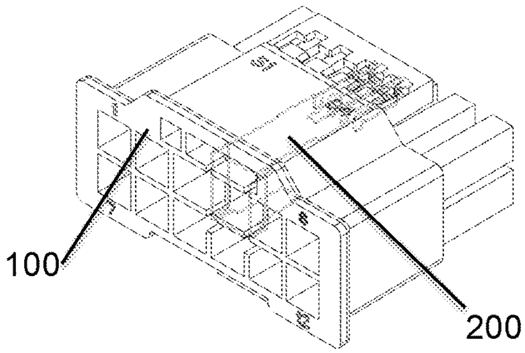
FIG. 3B
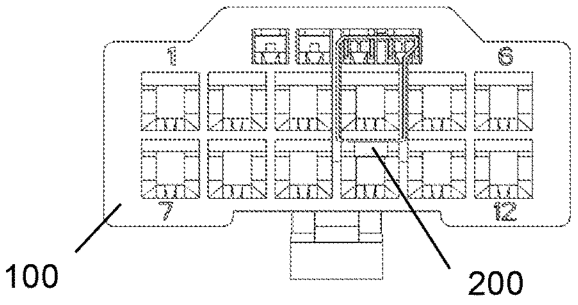
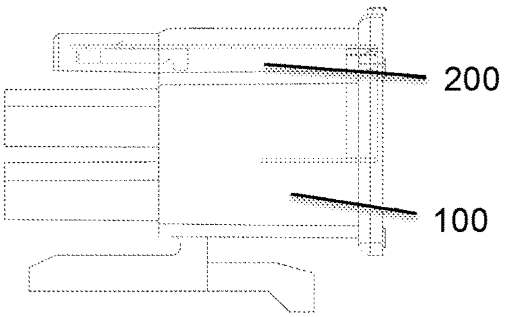
FIG. 3C
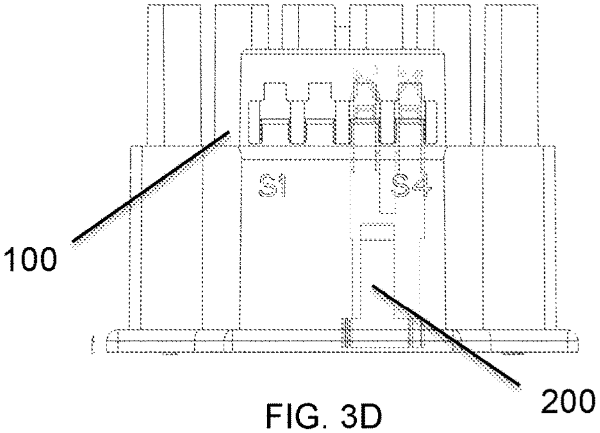
FIG. 3D

Fig. 4A
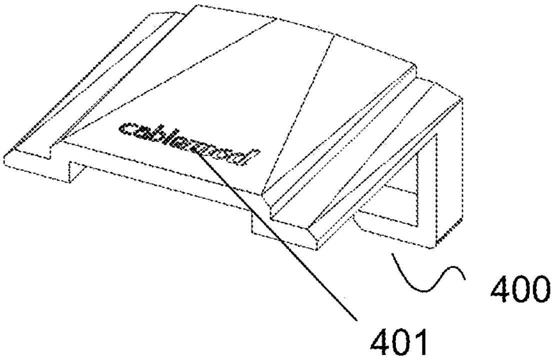
Fig. 4B
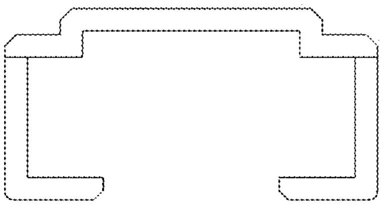
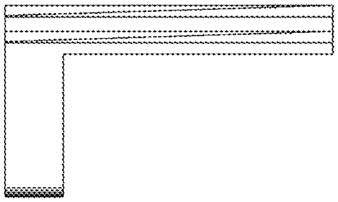
Fig. 4C
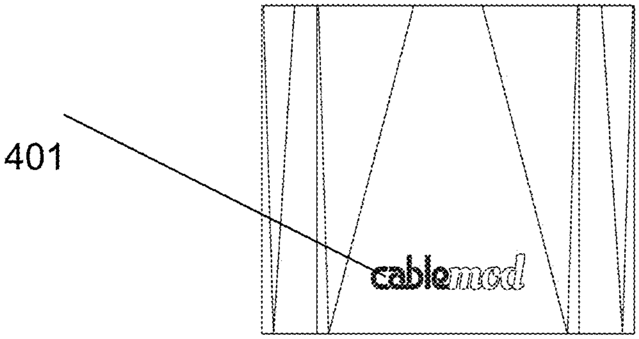
Fig. 4D

ELECTRONIC CONNECTOR WITH INTEGRATED DUAL SENSE TERMINAL DEVICE

TECHNICAL FIELD

The present disclosure relates generally to the field of electronic connectors. More specifically, the disclosure pertains to an electronic plastic connector with electrically conductive connector terminals crimped onto wires.

BACKGROUND

Traditional connectors require a physical connection between wires and terminals, often achieved through crimping. This process introduces additional points of electrical resistance, which can limit the overall performance of the electronic device. In particular, some connectors have sense terminals which function to measure the current carrying capability of the wires. Traditionally, these sense wires were also terminals crimped onto wires, which additionally introduces electrical resistance and voltage drops, causing the potential for incorrect measurements and overheating. Wires from these sense terminals then traditionally need to be connected to one or more of the power terminals by including the sense wire within the crimped power wire terminal, which again cause additional electrical resistance, and is physically and mechanically very cumbersome, time-consuming and difficult to do. Moreover, closely spaced terminals present a challenge in stamping individual pieces of metal to form the connectors due to potential interference with one or more of the power terminals in the connector.

In view of the above, there is a need for a different type of connector that would overcome the deficiencies noted above.

SUMMARY OF THE DISCLOSURE

Embodiments of the present disclosure introduces an electronic plastic connector that enhances the overall performance of electronic devices. It addresses existing issues in conventional connectors, such as the inherent electrical resistance that results from crimping wires to terminals, and the design challenges of closely spaced terminals.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include an electronic connector, including a housing having: a first row of power terminals, a second row of power terminals, and a row of sense terminals; and a stamped metal insert inserted into the housing, having: a first mating feature, and a second mating feature, wherein the housing further includes a groove that receives the stamped metal insert and establishes a pressurized connection between at least one of the sense terminals in the row of sense terminals and at least one of the power terminals in the first row of power terminals.

In another embodiment, the stamped metal insert is stamped out of a single piece of metal.

In a further embodiment, the first mating feature and the second mating feature are configured to mate with the corresponding groove.

In yet another embodiment, the housing further includes a latch mechanism having: a pair of connecting elements, a channel separating the pair of connecting elements and extends longitudinally from a front of the latch mechanism to a rear of the latch mechanism, and a thumb knob located at the front of the latch mechanism.

In another embodiment, the electronic connector further includes a cover mounted to the housing.

In a further embodiment, the cover is secured around the first row of the power terminals, the second row of the power terminals, and the row of sense terminals.

In yet another embodiment, the housing is configured to avoid electrical contact between the stamped metal insert and the first row of power terminals, while electrically connecting by contact to the second row of power terminals In another embodiment, the stamped metal insert is folded into a pattern, whereby the pressurized connection is facilitated by the pattern of the stamped metal insert.

In a further embodiment, the housing is made of plastic.

In yet another embodiment, the housing and the stamped metal insert are connectable together as a single unit.

The electronic connector disclosed herein, through its innovative design and functionality, offers a substantial improvement in the current carrying capacity of the overall system, reducing power losses and providing a more efficient electronic connection.

BRIEF DESCRIPTION OF THE DRAWINGS

FIG. 1A illustrates a perspective view of a main connector housing in an exemplary embodiment of the disclosure.

FIG. 1B illustrates a front view of the main connector housing in an exemplary embodiment of the disclosure.

FIG. 1C illustrates a right side view of the main connector housing in an exemplary embodiment of the disclosure.

FIG. 1D illustrates a top view of the main connector housing in an exemplary embodiment of the disclosure.

FIG. 1E illustrates a perspective view of a latch within the main connector housing in an exemplary embodiment.

FIG. 1F illustrates a front view of the latch within the main connector housing in an exemplary embodiment.

FIG. 1G illustrates a right side view of the latch within the main connector housing in an exemplary embodiment.

FIG. 1H illustrates a top view of the latch within the main connector housing in an exemplary embodiment.

FIG. 2A illustrates a perspective view of a stamped metal insert that is inserted into the main connector housing in an exemplary embodiment of the disclosure.

FIG. 2B illustrates a right side view of a stamped metal insert that is inserted into the main connector housing in an exemplary embodiment of the disclosure.

FIG. 2C illustrates a front view of a stamped metal insert that is inserted into the main connector housing in an exemplary embodiment of the disclosure.

FIG. 2D illustrates a top view of a stamped metal insert that is inserted into the main connector housing in an exemplary embodiment of the disclosure.

FIG. 3A illustrates a perspective view of the assembly of the main connector and the sense terminal metal insert together in an exemplary embodiment of the disclosure.

FIG. 3B illustrates a frontal view of the assembly of the main connector and the sense terminal metal insert together in an exemplary embodiment of the disclosure.

FIG. 3C illustrates a left side view of the assembly of the main connector and the sense terminal metal insert together in an exemplary embodiment of the disclosure.

FIG. 3D illustrates a top view of the assembly of the main connector and the sense terminal metal insert together in an exemplary embodiment of the disclosure.

FIG. 4A illustrates a perspective view of a cover for the connector in an exemplary embodiment of the disclosure.

FIG. 4B illustrates a frontal view of a cover for the connector in an exemplary embodiment of the disclosure.

FIG. 4C illustrates a right side view of a cover for the connector in an exemplary embodiment of the disclosure.

FIG. 4D illustrates a top view of a cover for the connector in an exemplary embodiment of the disclosure.

Figure 5A:
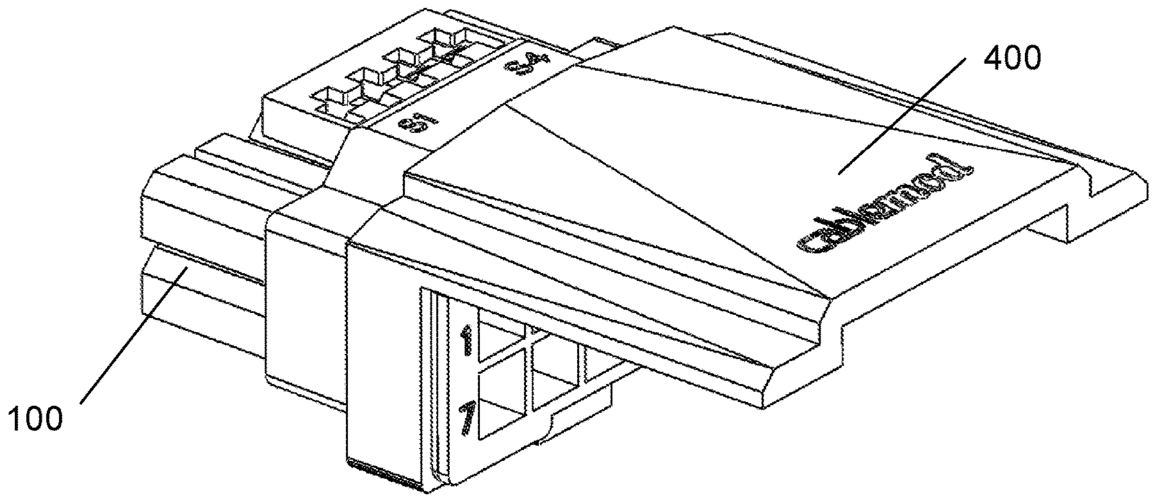
FIG. 5A illustrates a top perspective view of the cover mounted onto connector in an exemplary embodiment of the disclosure.

These drawings, in combination with the detailed descriptions provided, offer a comprehensive overview of the disclosure's structure and functionality. Each element corresponds to a specific feature in the drawings, allowing for a clearer understanding of the innovative design and operation of the connector.

DETAILED DESCRIPTION

Embodiments consistent with the present disclosure describe a stamped metal terminal that helps reduce the ohmic resistance between the sense terminals and the ground terminals, which substantially improves the current carrying capacity of the overall system.

That is, in an embodiment, the main body of the connector incorporates two rows of six power terminals each, designed to facilitate the transfer of power. Each of these terminals is an individual piece of metal, stamped onto a wire. To enhance the aesthetic appeal and provide protection, each wire may be encased within a sleeve.

Adjacent to the power terminals, the connector houses a row of sense terminals. This section of the connector, although structurally integrated with the power terminal section, serves a distinct function. The sense terminals monitor the flow of power and contribute to the safe and efficient operation of the electronic device.

Before the power terminals are inserted into the connector, a dual connector sense terminal device is placed into the first and second sense terminals. This device, stamped out from a single piece of metal, establishes a connection between the two sense terminals. Due to the close proximity of these terminals—a mere 2 mm apart—conventional stamping techniques would be impractical. The disclosure circumvents this issue by routing the first terminal through a groove that starts at the face of the main power part of the connector, bypassing the second row of power pins, and entering the first row of ground pins.

Another exemplary embodiment of the disclosure includes dual connector sense terminal device. This component integrates a mechanical flanged feature, configured at a specific angle (e.g., 45 degrees). This design facilitates a pressurized contact between the sense terminal and a ground terminal. This contact is maintained under relatively constant pressure due to the unique folding pattern of the dual sense terminal connector device. As such, a permanent and stable electrical connection is established, which may remain secure throughout the connector's lifecycle.

Embodiment of the disclosure further enhance its robustness through the addition of a cover. This cover, made from plastic, not only safeguards the connector terminal but also serves as an ornamental feature, adding to the overall aesthetic appeal of the connector.

Referring to FIGS. 1A-D, various views of a main connector housing 100 are illustrated, according to an embodiment. The main connector housing 100 (also known as a terminal block or a connection block) includes a first row of power terminals 101, a second row of power terminals (also referred to as ground terminals 102), a row of sense terminals 103, power terminal numbers 104 (e.g., 1-6; 7-12), sense terminal numbers 105 (e.g., S1-S4), a latch mechanism 106, and a groove 107.

The first row of the power terminals 101 may include power terminals 108 into which a power cable or wire (not shown) may be inserted. Each of the power terminals 108 may include a rectangular plastic block piece surrounding a metallic contact that is stamped on the bottom of each of the power terminals 108, so that the contact may easily be joined with the inserted power cable or wire. The first row of the power terminals 101 and the ground terminals 102 are individual pieces of metal, stamped out onto each power wire. In an embodiment, the first row of the power terminals 101 includes six power terminals 108 that form a part of a Direct Current (DC) power connector, each having a voltage of substantially 12 volts.

The second row of the power terminals 102 also may include power terminals 108, each with a same structure as the power terminals 108 within the first row of power terminals 101 for receiving a power cable or wire (not shown). However, as the second row of power terminals 102 serve as the ground for the respective first row of power terminals 101, in an embodiment, each of the six power terminals 108 of the second row of power terminals 102 would have a voltage of 0 volts.

Together the power terminals 108 within the first row of the power terminals 101 and the second row of power terminals carrying power and make up a first part of the connector housing 100.

The row of sense terminals 103 make up a second part of the connector housing 100. The sense terminals sense the power flowing through the first row of the power terminals 101 and determine if a proper connection is made.

Power terminal numbers 104 are written to the left and right sides of the first row of power terminals 101 and the second rows of second power terminals 102. They indicate the position of a power terminal 108 within either the first row of power terminals 101 or the second row of power terminals. For example, in an embodiment where there are six power terminals 108 within the first row of power terminals 101 and six power terminals 108 within the second row of power terminals 102, power terminal number 104 "1" may be written to the left of the first row of power terminals 101, while power terminal number "6" may be written to the right of the first row of power terminals 101. Similarly, power terminal number 104 "7" may be written to the left of the second row of power terminals 102, while the power terminal number "12" may be written to the right of the second row of power terminals 102.

Sense terminal numbers 105 are used to designate the position of the sense terminal within the row of sense terminals 103. For example, in an embodiment where there are four sense terminals within the row of sense terminals 103, sense terminal number 105 "S1" may be located to the left of the row of sense terminals 103 and sense terminal number 105 "S4" may be located to the right of the row of sense terminals 103.

The latch mechanism 106 is designed to ensure the main connector housing 100 remains securely attached to its mating connector (not shown), which may be a power supply (not shown).

Referring back to FIG. 1A, the groove 107 runs through the front of main connector housing 100 surrounding one of the power terminals 108 within the first row of power terminals 101. The groove 107 is designed to accommodate a stamped metal insert that is inserted into the main connector housing 100, which will be further described in FIGS. 2A-2D. In an embodiment, the groove 107 starts at the top face of the front part of the connector housing 100 and forms the borders of at least two consecutive sense terminals (e.g, S3 and S4) within the row of sense terminals 103 and ends at the bottom of the first row of power terminals 102 (e.g., terminal 108 "4") without touching the second row of power terminals 101 (e.g., terminal 108 "10" and also referred to as ground terminal "10"). The groove 107 allows for a permanent and stable connection between the sense terminal "S4" and the power terminal "4", and the connection remains under pressure for the lifetime of the connector as a result of mechanical force caused by the special folding pattern of a dual sense terminal connector device exemplified by the stamped metal insert that will be described below regarding FIGS. 2A-2D.

Referring to FIGS. 1E-H, the latch mechanism 106 within the main connector housing 100 is shown in isolated views for clarity, according to an embodiment. The latch mechanism 106 includes connecting elements 109, a channel 110, a latching wall 111, and a thumb knob 112. that attaches the latch mechanism 106 to a main body of the main connector housing 100. The connecting elements 109 include two hooked ridges that rise from an upper surface of the latch mechanism 106 at about a center section of the latch mechanism 106. The two hooked ridges each has a squared front end and rounded rear end that tapers horizontally towards the rear of the main connector housing 100, and are flexible to allow the main connector housing 100 to bend about the connecting element 109.

The channel 110 is located at a latitudinal center of the latch mechanism 106, and extends longitudinally from the front of the latch mechanism to the rear of the latch mechanism 106. The channel 110 also separates the two hooked ridges of the connecting element 109.

The latching wall 111 is located at the rear of the latch mechanism 106 where the channel 110's extension ends (i.e., is backed up to).

In operation, a user can press on the thumb knob 112, which activates a mechanism causing the latching wall 111 to lift, thereby allowing the main connector housing 100 to be easily connected or disconnected from another structure.

Referring now to FIGS. 2A-D, various views of a stamped metal insert 200 that is inserted into the main connector housing 100 are illustrated according to an embodiment. The metal insert 200 features a first mating feature 201 and a second mating feature 202, designed to connect with a corresponding spade terminal (not shown) on a mating main connector housing 100. A terminal feature 203, a metal bend that contacts the conductive portion of the ground terminal 108 described in FIG. 1 located at position "10," is also shown. Metal latches 204, 205 work to secure the stamped metal insert 200 upon its insertion into the main connector housing 100.

That is, in more detail, FIGS. 2A-D, shows the stamped metal insert 200 that is inserted into the main connector housing 100, according to an embodiment. The stamped metal insert 200, is a single-piece, stamped metallic device includes a first mating feature 201 and a second mating feature 202.

Each of the first mating feature 201 and the second mating feature 202 includes opposite-facing metal bends, facilitating a connection to a spade terminal on the opposite mating connector.

The terminal feature 203, which is a metal bend that contacts the conductive portion of the power terminal 108 located in position "10". This contact is held under pressure, ensuring a reliable connection.

Two metal latches 204, 205 retain the main connector housing 100 when the two metal latches 204, 205 are inserted into the main connector housing 100.

The surfaces 206, 207 on the metal insert 200 connect the terminal feature 203 to the two metal latches 204, 205. Forming a rounded rectangular shape, the surfaces 206, 207 are designed to match the profile shape of the groove 107 in the main connector housing 100, so that when the insert 200 is pushed into the main connector housing 100, the surface 206 and 207 and the groove 107 intersect and substantially touch.

Referring to FIGS. 3A-D, various views of the assembly of the main connector housing 100 connected with the sense terminal metal insert 200 are illustrated, according to an embodiment. The figures show how the stamped metal insert 200 is positioned within the main connector housing 100.

In more detail, comparing FIGS. 3A-D with FIGS. 2A-D, the sense terminal metal insert 200 is inserted into the main connector housing 100 (before any of the power terminals 108 and or/power cable/wiring are inserted into the connector housing 100, the stamped metal insert 200 is inserted, so that the surfaces 206, 207 of the metal insert press-fit into the groove 107 of the main connector housing 100. At the same time, the first mating feature 201 and the second mating feature 202 extends into the back of the main connector housing 100, through a space between the first row of power terminals 101 and the row of sense terminals 103. The metal latches 204, 205 (i.e., pins) respectively catch the upper surface of the main connector housing 100 where the sense terminals S3 and S4 of the row of sense 103 are located, while the first mating feature 201 and the second mating feature 202 mechanically connect to the spade terminal on the opposite mating connector.

The dual-connection established by the sense terminal insert 200 to the main connector housing 100 creates a crimp-free, low-resistance path for electrical currents to flow and allows a more solid connection between the power cable/wire with the terminal within a confined space. Furthermore, the connections allows the power delivery of the power terminal 108 (e.g., power terminal 108 "4" to be more accurately sensed by the corresponding sense terminal (e.g., "S4") within the row of sense terminals 103, thereby more accurately determine whether the connection is completely established.

Referring to FIGS. 4A-D, various views of a cover 400 are illustrated, according to an embodiment. The cover 400 (branded with a logo 401), covers the connector terminal and protect it from environmental damage.

Figure 5B:
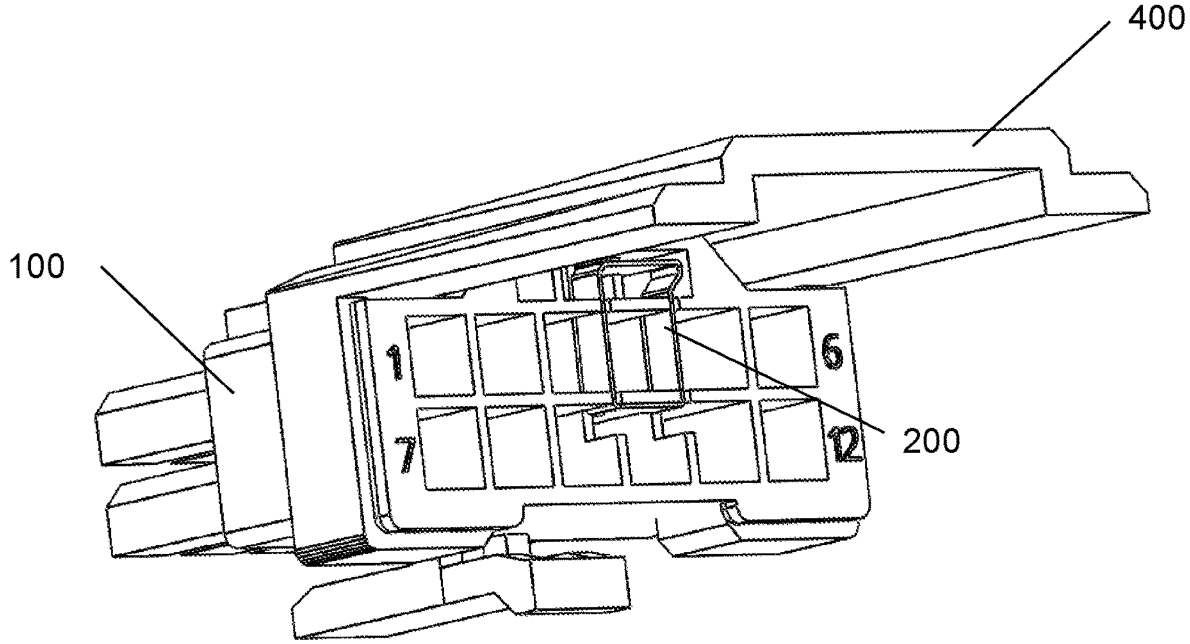
FIG. 5B illustrates a bottom perspective view of the cover mounted onto connector in an exemplary embodiment of the disclosure.

Referring to FIG. 5, the cover 400 is mounted onto the main connector housing 100. The cover 400, which has an upper extension, protects the main connector housing 100 from dust and other objects that may fall on top of the main connector housing 100, can be easily slid onto added or removed from the area surrounding the power terminals 101 and the ground terminals 102, allowing the user with the option to use it as and when required.

The disclosure, as detailed above, improves the overall performance of the product by allowing for more current to flow and reducing resistance. This reduces the overall power loss of the system as a result of electrical resistance in the terminals and terminal to wire junctions, making it a significant advancement in the field of electronic connectors.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. An electronic connector, comprising:

a housing having:

a first row of power terminals, a second row of power terminals, and a row of sense terminals; and a stamped metal insert inserted into the housing, having:

a first mating feature, and a second mating feature, wherein the first mating feature and the second mating feature are designed to connect with a corresponding terminal on a mating connector, and wherein the housing further includes a groove that receives the stamped metal insert and establishes a pressurized connection between at least one of the sense terminals in the row of sense terminals and at least one of the power terminals in the first row of power terminals.

2. The electronic connector of claim 1, wherein the stamped metal insert is stamped out of a single piece of metal.

3. The electronic connector of claim 1, wherein the first mating feature and the second mating feature are configured to mate with the groove in the housing.

4. The electronic connector of claim 1, wherein the housing further comprises a latch mechanism having:

a pair of connecting elements, a channel separating the pair of connecting elements and extends longitudinally from a front of the latch mechanism to a rear of the latch mechanism, and a thumb knob located at the front of the latch mechanism.

5. The electronic connector of claim 1, further comprising a cover mounted to the housing.

6. The electronic connector of claim 5, wherein the cover is secured around the first row of the power terminals, the second row of the power terminals, and the row of sense terminals.

7. The electronic connector of claim 1, wherein the housing is configured to avoid electrical contact between the stamped metal insert and the first row of power terminals, while electrically connecting by contact to the second row of power terminals.

8. The electronic connector of claim 1, wherein the stamped metal insert is folded into a pattern, whereby the pressurized connection is facilitated by the pattern of the stamped metal insert.

9. The electronic connector of claim 1, wherein the housing is made of plastic.

10. The electronic connector of claim 1, wherein the housing and the stamped metal insert are connectable together as a single unit.

* * * * *